Figure 1:
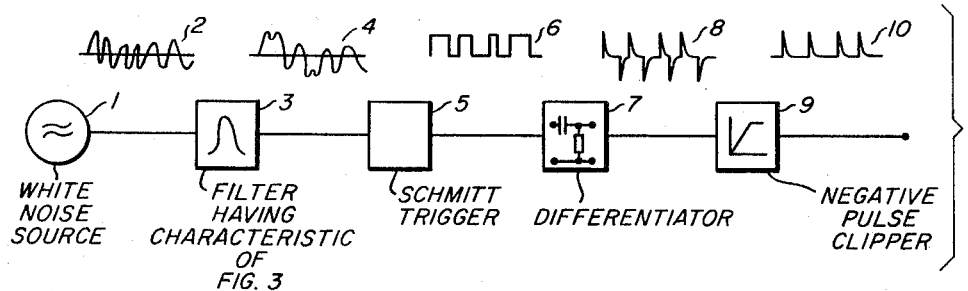

Feb. 14, 1967 W. STIELER 3,304,515
RANDOM PULSE GENERATOR
Filed Nov. 20, 1959 2 Sheets-Sheet 1

INVENTOR
WERNER STIELER

Feb. 14, 1967 W. STIELER 3,304,515
RANDOM PULSE GENERATOR
Filed Nov. 20, 1959 2 Sheets-Sheet 2
FIG. 6
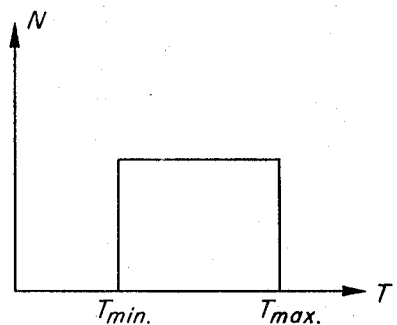
FIG. 7
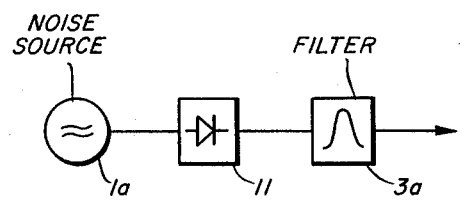
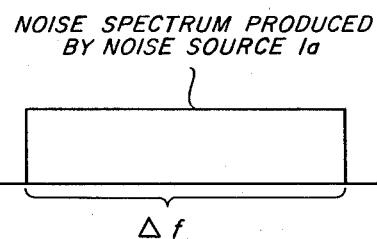
FIG. 8
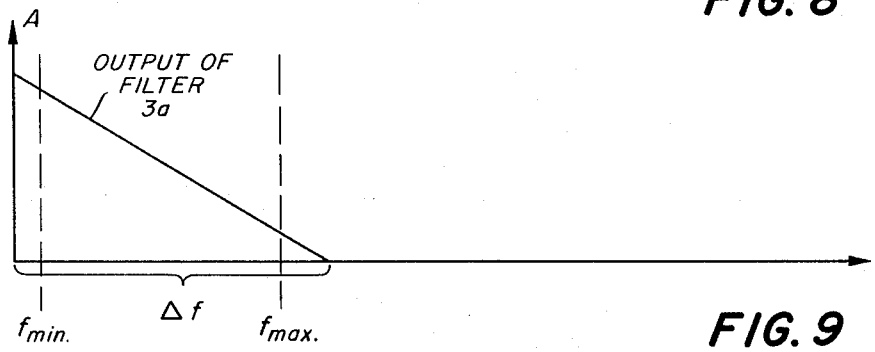
FIG. 9
INVENTOR
WERNER STIELER

United States Patent Office 3,304,515
Patented Feb. 14, 1967

3,304,515
RANDOM PULSE GENERATOR
Werner Stieler, Ulm (Danube), Germany, assignor to
Telefunken G.m.b.H., Berlin, Germany
Filed Nov. 20, 1959, Ser. No. 854,511
Claims priority, application Germany, Nov. 24, 1958,
T 15,920
2 Claims. (Cl. 331—78)

The present invention relates to a system for generating a pulse sequence having random pulse spacings within a range of maximum and minimum intervals.

A radar apparatus has been known which transmits a pulse sequence with arbitrarily varying pulse spacings. With such radar apparatus, it is possible to decrease the disturbances caused by another pulse transmitter on the presentation screen. Generally, several echo signals are necessary to brighten a spot on the presentation screen in radar apparatus. Therefore, another pulse transmitter has to transmit a pulse sequence corresponding to the transmitting pulse sequence of the radar apparatus in order to cause disturbances. In the case of varying radar transmitting pulse repetition rates, it is almost impossible to follow this pulse repetition rate accurately. If the disturbing pulse transmitter transmits at a constant pulse repetition rate, only weakly luminescent traces appear as disturbances on the radar picture screen, said traces being clearly distinguishable from a target.

In a known radar system for producing a pulse sequence with varying pulse spacings, a quartz oscillator has been used, wherein a train of pulses with constant pulse spacing is generated therefrom by means of a blocking oscillator. Individual pulses are selected from this train of pulses by means of a gate circuit, the spacings between the selected individual pulses being different from one another. The temporary opening of the gate circuit is caused by means of a gate pulse, the phase of which is arbitrarily and continuously changed.

The disadvantage of this known system resides in that the transmitted pulse sequence produced has pulse spacings which do not vary entirely arbitrarily, because the pulse sequence produced is derived from a train of pulses having constant pulse spacings and the pulse sequence produced has pulse intervals which are always an integral multiple of said constant pulse spacings. In addition to this, the complexity of this known system is great.

Furthermore, a system for producing a pulse sequence with statistically varying pulse repetition rates has been known in which the triggering of a relaxation circuit producing the pulse sequence is arbitrarily caused by the output voltage of a noise generator. The pulse intervals of the pulse sequence generated with this system may assume any values and are not limited to any particular range, so that this system is not suited, for example, for use in radar apparatus.

It is an object of the present invention to provide an apparatus for producing a pulse sequence, the intervals of which statistically vary between two limits, and wherein the statistical variation is derived from a noise voltage. The system according to the invention is particularly suited to radar apparatus for scanning of transmitters. However, it can also be used for other purposes, for example, for coding of intelligence. The new system is distinguished by its simplicity.

It is another object of the invention to connect a frequency-selective means to the output of the noise source to provide additional means to produce pulses from the frequency-limited noise voltage, and to determine the selectivity curve of the frequency-selective means in such a manner, that the pulse intervals of the pulse sequence to be obtained lie between two time limit values within the desired frequency distribution.

Still further objects and the entire scope of applicability of the present invention will become apparent from the detailed description given hereinafter; it should be understood, however, that the detailed description and specific examples, while indicating preferred embodiments of the invention, are given by way of illusration only, since various changes and modifications within the spirit and scope of the invention will become apparent to those skilled in the art from this detailed description.

Figure 2:
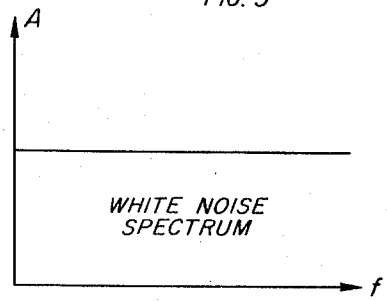
Figure 3:
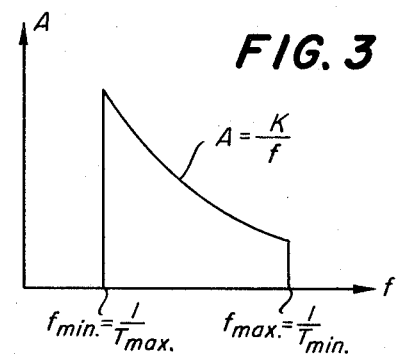
Figure 4:
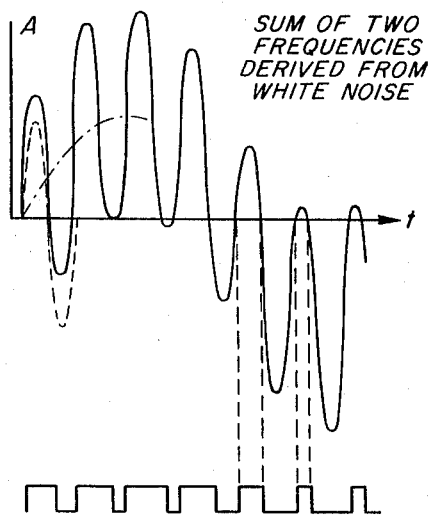
Figure 5:
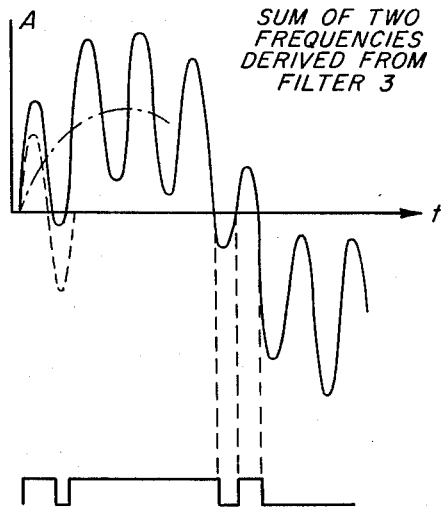

In the drawings:
FIGURE 1 shows schematically a block diagram of an embodiment of the invention with illustrations of wave forms therein;
FIGURE 2 shows the spectrum of the components of a white noise;
FIGURE 3 is a graph of the selectivity curve of a noise filter;
FIGURES 4 and 5 are graphical illustrations of the relative amplitudes of input and output voltages respectively of the noise filter;
FIGURE 6 is a graphical illustration of the output distribution of long and short pulse spacings by a filter having the characteristic curve shown in FIGURE 3;
FIGURE 7 is a block diagram of another embodiment of the invention;
FIGURE 8 shows the noise spectrum of the noise generator of FIGURE 7; and
FIGURE 9 shows the output spectrum of the rectifier of FIGURE 7.

In FIGURE 1, a noise source 1 produces a random noise voltage 2. A superregenerative receiver may suitably be used as a noise source, as such receivers produce very intensive noise. Instead of such receiver, other noise sources, such as resistances, semiconductors, or gas discharge units may be used. It is also conceivable to directly produce pulses from the noise voltage by known energy conversion means, whereby the spacings would actually vary statistically. However, in the noise spectrum, generally all kinds of frequencies, i.e., very high and very low frequencies are present and, in such case, very short as well as very long pulse intervals would be obtained. In radar apparatus, it is necessary that the intervals between two pulses correspond to at least twice the transit time of the maximum radar range and, actually, an even larger spacing between two pulses should be provided. In addition to this, two sequential transmitting pulses should be spaced not too far from one another, because the number of echoes from a target is thereby greatly reduced.

A filter 3 connected to the output of the noise source 1 is provided to suppress the very high and the very low frequencies in the noise input. Such filtered noise is illustrated at 4. The circuit components connected after the filter 3 comprise known means adapted to produce pulses from an alternating voltage. It is assumed in the present embodiment that a voltage discriminator 5 is connected to the filter 3, said discriminator being, for example, a Schmitt trigger or a Multiar circuit. This voltage discriminator produces a rising leading edge when the voltage 4 fed to the input goes beyond a certain threshold value, while a trailing edge of a pulse is produced when the input voltage goes below a second threshold value which, frequently, is lower than the first threshold value. In such case, rectangular pulses 6 are produced. In place of the voltage discriminator 5, the rectangular pulses can be produced by amplification of the filtered noise voltage and amplitude clipping. The rectangular pulses can be transformed into a train of pulses by means of a differentiating member 7, said pulse train being indicated at 8. The negative peaks of the pulse train 8 are then removed by means of a clipping circuit 9, so that only a sequence of positive pulses 10 remains which, thereafter, can be used, for example, for triggering of a radar transmitter, if needed, after transmitter pulse formation.

The filter 3, being the essential component of this circuit, will be explained in the following more closely. It is assumed that the noise source 1 produces a white noise, i.e., the amplitude of all of the frequency components of the noise has about the same size. FIGURE 2 shows graphically the spectrum of the white noise, the frequency $f$ being plotted on the abscissa and the amplitude A on the ordinate.

FIGURE 3 is an example of a selectivity curve of the filter 3 plotted in amplitude values A on the ordinate with respect to the frequency $f$ on the abscissa. The characteristic shown is selected so that the components selected from the source of white noise with random spacings shall produce pulses of the pulse train occurring between the smallest desired interval $T_{min}$ and the largest desired interval $T_{max}$ with relatively even distribution. The lower limit frequency of this filter is $f_{min}=1/T_{max}$ and, accordingly, the upper limit frequency is $$f_{max}=1/T_{min}$$

In case of the lower limit frequency, the selectivity characteristic should rise as steeply as possible up to a high value A, then should descend along a hyperbolic curve to a lower value of A, and then at the upper limit frequency, should decrease to zero as steeply as possible. Such filter characteristic gives the result that the lower frequencies in the pass-range of the filter are passed with greater amplitudes than the higher frequencies. This is due to the following circumstance:

In the case of the white noise, in which all of the frequencies are present with the same amplitude, there must be present more cycles of the higher frequencies than of the lower frequencies, due to the differences in the duration of the cycles within a unit of time. In view of the fact that, according to FIGURE 1, the pulse intervals of the pulse train to be produced depend on the zero crossings of the filtered noise voltage, short pulse spacings corresponding to the higher noise frequencies tend to occur more frequently than the longer spacings corresponding to the lower frequencies if in the noise spectrum, which is utilized for the pulse generation, all of the frequencies are present with the same amplitude.

As will be explained with reference to FIGURES 4 and 5, the pulse spacings of the pulse train to be produced depend also on the amplitude relation of the frequency components of the noise from which the pulse train is derived. For the sake of simplicity, it is assumed in FIGURES 4 and 5 that the "noise" is composed only of two oscillations, i.e., one at lower frequency, indicated by a dash-dot line, and one at higher frequency, indicated by a dash-dash line. In the example of FIGURE 4, the amplitudes of the oscillation at the higher and lower frequencies are equal, as is also the case with white noise, In the example of FIGURE 5, the oscillation at the higher frequency, as obtained at the output of a filter with the filter characteristic of FIGURE 3, is smaller than the amplitude of oscillation at lower frequencies. If the two oscillations at different frequencies in the examples of FIGURES 4 and 5 are added, a characteristic is obtained which is illustrated by the solid-line curves. It is easily recognizable that the oscillation obtained according to FIGURE 4 has substantially more zero crossings of the voltage than the oscillation according to FIGURE 5. If the filtered noise voltage, as shown in the example of FIGURE 1, is used for triggering, for example, a Schmitt circuit which, as assumed for the sake of simplicity, produces the pulse edges always at zero crossings of the oscillation, pulse characteristics are obtained as illustrated across the bottoms of FIGURES 4 and 5.

It can be seen that the pulse characteristic according to FIGURE 4 has substantially more short interval pulses, while in the pulse characteristic of FIGURE 5 mostly longer pulse intervals occur. The lower frequencies and higher frequencies with larger amplitude must be passed through a filter having the curve illustrated in FIGURE 3, so that the different spacings between the zero crossings and, therefore, the different pulse spacings to be generated from $T_{min}$ to $T_{max}$ occur with about equal distribution.

The distribution of the spacings T between the zero crossings of the noise voltage obtained at the output of the filter 3 in the embodiment of FIGURE 1 is plotted as a function of T and has about the shape illustrated in FIGURE 6. N shows the frequency of the occurrence of an oscillation having a certain interval considered over a long period of time. Spacings T outside of the limit value $T_{min}$ or $T_{max}$ no longer occur and the interval distribution between these two limit values is approximately constant, i.e., all pulse spacings in the pulse sequence produced occur with the same probability.

It may be desirable to produce another distribution than that illustrated in FIGURE 6. For example, it is possible to cause individual spacings to occur in particular preference. In the same way, it is possible that the noise source does not produce a white noise, but rather a noise in which the effective values of the components decrease linearly with increasing frequencies. In such case, the filter 3 should have another characteristic. The filter characteristic is determined, preferably, empirically, because the noise is difficult to be precisely calculated. The empirical determination is obtained in such a manner, that the desired frequency distribution for the time intervals T between two zero crossings of the noise voltage is ascertained at the output of the filter and the filter is tuned until the desired frequency distribution is obtained.

The filter is suitably made variable so that different filter curves can be obtained selectively. Such different filter curves are particularly desirable if the system is used in a radar apparatus having several different distance measuring ranges. In such case, the limit frequencies $f_{min}$ and $f_{max}$ and, thereby, the limit values $T_{min}$ and $T_{max}$ can be selectively varied, together with the distance range switching, particularly by means of electronic tuning devices, such as reactance tubes.

It has been assumed in the foregoing that the component 3 is a filter. In place of a passive filter, a frequency selective amplifier with band-pass characteristics may be employed, whereby the filter characteristic of this amplifier, likewise, is suitably variable.

Another embodiment of the invention, shown in FIGURE 7, will be explained with reference to the diagrams of FIGURES 8 and 9. As in FIGURE 1, a noise source 1a is also provided in the embodiment of FIGURE 7. Between this noise source 1a and the filter 3a, a nonlinear component, such as a rectifier 11, with square-shaped characteristics is inserted. Otherwise, the circuit of FIGURE 7 corresponds to that of FIGURE 1. It is assumed that the noise source 1 in FIGURE 7 produces a spectrum about as shown in FIGURE 8. This spectrum represents a white noise present within a certain frequency range $\Delta f$. If this spectrum is fed to square law rectifier 11, an output spectrum as shown in FIGURE 9, is obtained. The triangular spectrum present in the range of lower frequencies is obtained by mixing the noise source producing the spectrum according to FIGURE 8 with itself. Rectification of a signal means nothing but mixing of a frequency with itself. The high amplitude of the triangular spectrum in the lower frequency range close to zero frequency and the low amplitudes at the higher frequencies of this spectrum range can be explained simply by the fact that a signal containing each of the frequencies present in the spectrum of FIGURE 8 when mixed with itself results in zero frequency, while the next higher frequency of the triangular spectrum appears only once. This frequency is the difference frequency between the upper limit and the lower limit frequencies of the spectrum according to FIGURE 8. With decreasing frequencies, the amplitudes of the oscillation components increase, because there are still more possible difference frequencies of the frequencies present in the spectrum according to FIGURE 8 towards the lower frequency end. Obviously, still higher frequencies are present in the spectrum of FIGURE 9, said frequencies not being shown separately in this figure, because they will be filtered out later on anyhow. In this embodiment, it is the purpose of the filter $3a$ to pass a certain spectrum range of the total spectrum of FIGURE 9. In accordance with the required values of $T_{min}$ and $T_{max}$, the limit frequencies of this filter are at $f_{max}$ and $f_{min}$. All of the remaining frequencies are filtered out beyond these limit frequencies. A spectrum is then obtained between the limit frequencies $f_{min}$ and $f_{max}$ which corresponds approximately to the spectrum as obtained in the output of the filter 3 in the embodiment of FIGURE 1.

In order to assure that no shorter pulse interval than $T_{min}$ is obtained, frequency selective means of relatively large steepness have to be used.

According to a further development of the invention, it is possible to use frequency selective means with relatively smaller steepness if, beyond the frequency selective means, a gate circuit is provided which always blocks again at the end of the time at which a pulse of the pulse train is produced and the gate remains blocked for a time interval corresponding to the shortest permissible pulse spacing $T_{min}$. The gate circuit may be provided at any place beyond the frequency selective means. In the example of FIGURE 1, the gate circuit may be inserted beyond the components 3, 5, 7 or 9.

In radar apparatus, several equal pulse sequences are employed, though displaced in time with respect to one another. For example, a first pulse sequence serves for the initiation of the viewing trace, i.e., for the blanking of each preceding electron ray deflection in the radar indicating tube, and another delayed pulse sequence for transmitting, scanning and/or triggering of new deflection cycles of the viewing apparatus. The last mentioned steps may be triggered by one pulse, so that in radar apparatus generally two equal pulse sequences are required. The generation of several equal pulse sequences which are displaced with respect to one another from a pulse sequence generated in the system according to the invention can be carried out by means of delay lines in a manner known per se.

I claim:

1. In a system for generating randomly occuring pulses having maximum and minimum time spacing $T_{max}$ and $T_{min}$ and a substantially uniform statistical distribution of said pulses, a source of wide band noise, a bandpass filter connected in cascade with said source of wide band noise, said bandpass filter having substantially vertically sharp cut-off frequencies at a minimum frequency$=K/T_{max}$ and at a maximum frequency$=K/T_{min}$, where T is time interval, and relatively large responses at said cutoff frequencies, said bandpass filter further having a generally hyperbolic descending response characteristic from said minimum cutoff frequency to said maximum cutoff frequency, and means responsive to the response of said filter for generating pulses substantially only at zero crosings of said response, whereby the slope of said descending response characteristic provides at least a nearly uniform distribution of time spacing of said pulses within the time intervals $T_{max}$ and $T_{min}$.

2. In a system for generating randomly occurring pulses having a maximum and a minimum time spacing $T_{max}$ and $T_{min}$, respectively, and a substantially uniform statistical distribution of spacings of said pulses, a source of wide band noise of limited spectral width, a square law modulator connected in cascade with said source of wide band noise, a band pass filter having substantially vertical upper and lower cut off connected in cascade with said square wave modulator for selecting only frequency responses of said square law modulator which occur within a band of frequencies between $K/T_{max}$ and $K/T_{min}$, and means for generating short pulses occuring only at the zero crossings of the wave form existing at the output of said band pass filter, said spectral width being at least equal to the band width of said band pass filter.

References Cited by the Examiner

UNITED STATES PATENTS

| 2,505,594 | 4/1950 | Wallace | 331—78 |
| 2,513,308 | 7/1950 | Grieg | 332—9 |
| 2,567,850 | 9/1951 | Licklider | 331—78 |
| 2,768,372 | 10/1956 | Green | 343—17.1 |
| 3,773,185 | 12/1956 | Fulton et al. | 331—78 |
| 2,870,327 | 1/1959 | MacWilliams et al. | 328—59 XR |

OTHER REFERENCES

The Theory of Networks in Electrical Communications and Other Fields, by Rogers, published by MacDonald London, 1957.

Pub. I, Threshold Signals, by Lawson and Uhlenbeck, vol. 24, MIT Radiation Laboratory Series, pp. 59–61.

ROY LAKE, *Primary Examiner.*

FREDERICK M. STRADER, CHESTER L. JUSTUS,
*Examiners.*

T. D. JENNINGS, K. CLAFFY, S. H. GRIMM,
*Assistant Examiners.*